United States Patent
Nakamura et al.

(10) Patent No.: US 9,139,712 B2
(45) Date of Patent: Sep. 22, 2015

(54) GOLF BALL

(75) Inventors: Hirotaka Nakamura, Kobe (JP); Keiji Ohama, Kobe (JP)

(73) Assignee: DUNLOP SPORTS CO. LTD., Kobe-Shi (JP)

(*) Notice: Subject to any disclaimer, the term of this patent is extended or adjusted under 35 U.S.C. 154(b) by 628 days.

(21) Appl. No.: 12/420,883

(22) Filed: Apr. 9, 2009

(65) Prior Publication Data

US 2009/0270202 A1    Oct. 29, 2009

(30) Foreign Application Priority Data

Apr. 28, 2008 (JP) .................................. 2008-116866
Nov. 18, 2008 (JP) .................................. 2008-293990

(51) Int. Cl.
*A63B 37/06* (2006.01)
*C08K 5/14* (2006.01)
*C08K 5/098* (2006.01)
*A63B 37/00* (2006.01)

(52) U.S. Cl.
CPC ............... *C08K 5/14* (2013.01); *A63B 37/0063* (2013.01); *A63B 37/0064* (2013.01); *A63B 37/0092* (2013.01); *C08K 5/098* (2013.01); *A63B 37/0044* (2013.01)

(58) Field of Classification Search
CPC .................................................. A63B 37/0062
USPC .................................................. 473/373, 374
See application file for complete search history.

(56) References Cited

U.S. PATENT DOCUMENTS

| | | | |
|---|---|---|---|
| 6,379,269 B1 * | 4/2002 | Nesbitt et al. | 473/371 |
| 7,153,224 B2 * | 12/2006 | Higuchi et al. | 473/376 |
| 7,410,429 B1 * | 8/2008 | Bulpett et al. | 473/376 |
| 2003/0064828 A1 | 4/2003 | Kato | |
| 2003/0109332 A1 | 6/2003 | Ohama et al. | |
| 2003/0166422 A1 | 9/2003 | Kato et al. | |
| 2003/0211902 A1 | 11/2003 | Kato et al. | |
| 2004/0033847 A1 | 2/2004 | Higuchi et al. | |
| 2004/0266557 A1 | 12/2004 | Ohama | |
| 2008/0274828 A1 * | 11/2008 | Comeau et al. | 473/374 |
| 2008/0274829 A1 * | 11/2008 | Comeau et al. | 473/374 |
| 2008/0274830 A1 * | 11/2008 | Comeau et al. | 473/374 |
| 2008/0274834 A1 * | 11/2008 | Comeau et al. | 473/374 |

* cited by examiner

*Primary Examiner* — Raeann Gorden
(74) *Attorney, Agent, or Firm* — Birch, Stewart, Kolasch & Birch, LLP

(57) ABSTRACT

A golf ball 2 has a spherical core 4 and a cover 6 positioned outside this core 4. The core 4 has a spherical center 8 and a mid layer 10 positioned outside this center 8. The center 8 is formed by crosslinking a rubber composition. A base rubber of the rubber composition contains polybutadiene as a principal component. The rubber composition contains sulfur as a crosslinking agent. The center 8 has a diameter of 1 mm or greater and 15 mm or less. The center 8 has a central hardness H1 of 20 or greater and 50 or less. A difference (H4−H3) between a hardness H4 of a surface of the mid layer 10 and a hardness of an innermost part thereof is equal to or greater than 10.

4 Claims, 1 Drawing Sheet

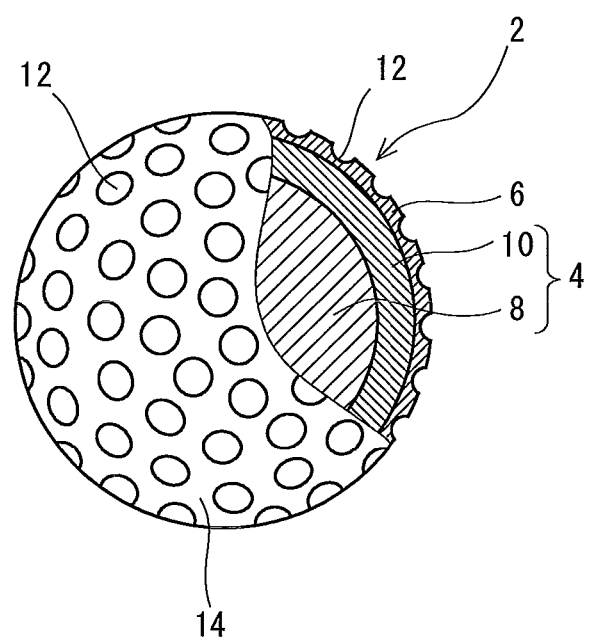

great flight distance. The flight performance is also further correlated with spin rate. The golf ball flies at a small spin rate, thereby obtaining proper trajectory to accomplish great flight distance. In light of flight performance, golf balls which have high resilience performance and are not likely to be spun are desired.

GOLF BALL

This application claims priority on Patent Application No. 2008-116866 filed in JAPAN on Apr. 28, 2008, and Patent Application No. 2008-293990 filed in JAPAN on Nov. 18, 2008. The entire contents of the Japanese Patent Applications are hereby incorporated by reference.

BACKGROUND OF THE INVENTION

1. Field of the Invention

The present invention relates to golf balls. More particularly, the present invention relates to multi-piece golf balls having a center, a mid layer and a cover.

2. Description of the Related Art

Golf players' greatest demand for golf balls is flight performance. Golf players emphasize flight performance with a driver, a long iron and a middle iron. The flight performance is correlated with the resilience performance of the golf ball. When the golf ball excellent in resilience performance is hit, the golf ball flies at a fast speed to accomplish great flight distance. The flight performance is also further correlated with spin rate. The golf ball flies at a small spin rate, thereby obtaining proper trajectory to accomplish great flight distance. In light of flight performance, golf balls which have high resilience performance and are not likely to be spun are desired.

Japanese Unexamined Patent Application Publication No. 2003-10359 (US2003/64828) discloses a golf ball having a center, a mid layer and a cover. This center has a small diameter and a small hardness. A spherical body including the center and the mid layer has an outer-hard/inner-soft structure. This structure accomplishes a small spin rate upon shots with a driver.

Japanese Unexamined Patent Application Publication No. 2003-19227 (US2003/109332) discloses a golfball having a center, an inner layer cover and an outer cover. In this center, a difference between a surface hardness and a central hardness is large. This center has an outer-hard/inner-soft structure. This structure accomplishes a small spin rate upon shots with a driver.

Japanese Unexamined Patent Application Publication No. 2003-205052 (US2003/166422) discloses a golfball having a center, a mid layer and a cover. This center has a small diameter and a small hardness. A spherical body including the center and the mid layer has an outer-hard/inner-soft structure. This structure accomplishes a small spin rate upon shots with a driver. A cover is made of polyurethane. This cover accomplishes a great spin rate upon shots with a short iron.

Japanese Unexamined Patent Application Publication No. 2003-325702 (US2003/211902) discloses a golfball having a center, a mid layer and a cover. This center contains a silicone rubber. A spherical body including the center and the mid layer has an outer-hard/inner-soft structure. This structure accomplishes a small spin rate upon shots with a driver.

Japanese Unexamined Patent Application Publication No. 2005-13455 (US2004/266557) discloses a golf ball having a core and a cover. In this core, a difference between a surface hardness and a central hardness is large. This core has an outer-hard/inner-soft structure. This structure accomplishes a small spin rate upon shots with a driver.

A core of a conventional golf ball uses a soft center and a hard mid layer in order to attain an outer-hard/inner-soft structure. The hardness distribution up to the central point of a center from the surface of a mid layer has a large level difference on the boundary of the center and the mid layer. This level difference deteriorates the suppression of spin. The flight performance of the conventional golf ball is insufficient.

Golf players' demand to the flight distance of the golf ball has been increasingly escalating. Golf player desires a golf ball which is not further likely to be spun. It is an object of the present invention to provide a golf ball excellent in flight performance.

SUMMARY OF THE INVENTION

A golf ball according to the present invention includes a center, a mid layer positioned outside the center and a cover positioned outside the mid layer. The center has a diameter of 1 mm or greater and 15 mm or less. The center has a central point having a JIS-C hardness H1 of 20 or greater and 50 or less. A difference (H4−H3) between a JIS-C hardness H4 of a surface of the mid layer and a JIS-C hardness H3 of an innermost part thereof is equal to or greater than 10.

In this golf ball, the center having the central point having the small hardness H1 accomplishes an outer-hard/inner-soft structure. In this golf ball, the diameter of the center is small and the hardness difference (H4−H3) of the mid layer is large. Therefore, the level difference of the hardness on the boundary of the center and the mid layer is small. The conventional golf ball has an outer-hard/inner-soft structure having inferior continuity of hardness distribution. On the other hand, the golf ball according to the present invention has an outer-hard/inner-soft structure having excellent continuity of hardness distribution. In this golf ball, the spin is sufficiently suppressed. This golf ball has excellent flight performance.

Preferably, a difference (H3−H2) between the hardness H3 and a JIS-C hardness H2 of a surface of the center is equal to or greater than 35.

Preferably, a difference (H4−H1) between the hardness H4 and the hardness H1 is equal to or greater than 40.

The center may be formed by crosslinking a rubber composition. Preferably, a base rubber of the rubber composition contains polybutadiene as a principal component. The rubber composition contains sulfur as a crosslinking agent.

The mid layer may be formed by crosslinking a rubber composition. Preferably, a base rubber of the rubber composition contains polybutadiene as a principal component.

BRIEF DESCRIPTION OF THE DRAWINGS

FIG. 1 shows a schematic cross-sectional view illustrating a golf ball according to one embodiment of the present invention

DESCRIPTION OF THE PREFERRED EMBODIMENTS

The present invention will be hereinafter described in detail with appropriate references to the accompanying drawing, according to preferred embodiments.

A golf ball 2 shown in FIG. 1 has a spherical core 4, and a cover 6 positioned outside this core 4. The core 4 has a spherical center 8, and a mid layer 10 positioned outside this center 8. Numerous dimples 12 are formed on the surface of the cover 6. Of the surface of the golf ball 2, a part other than the dimples 12 is land 14. This golf ball 2 has a paint layer and a mark layer on the external side of the cover 6, although these layers are not shown in the Figure.

This golf ball 2 has a diameter of from 40 mm to 45 mm. From the standpoint of conformity to a rule defined by United States Golf Association (USGA), the diameter is more preferably equal to or greater than 42.67 mm. In light of suppression of the air resistance, the diameter is preferably equal to or less than 44 mm, and more preferably equal to or less than 42.80 mm. The weight of this golf ball 2 is 40 g or greater and 50 g or less. In light of attainment of great inertia, the weight is preferably equal to or greater than 44 g, and more preferably equal to or greater than 45.00 g. From the standpoint of conformity to a rule defined by USGA, the weight is preferably equal to or less than 45.93 g.

The center 8 is obtained through crosslinking of a rubber composition. Illustrative examples of preferable base rubber include polybutadienes, polyisoprenes, styrene-butadiene copolymers, ethylene-propylene-diene copolymers and natural rubbers. In light of the resilience performance, polybutadienes are preferred. When other rubber is used in combination with polybutadiene, it is preferred that the polybutadiene is included as a principal component. Specifically, it is preferred that percentage of polybutadiene in the entire base rubber is equal to or greater than 50% by weight, and more preferably equal to or greater than 80% by weight. Preferably, polyurethanes have a percentage of cis-1,4 bonds of equal to or greater than 40%, and more preferably equal to or greater than 80%.

The rubber composition of the center 8 contains sulfur. This sulfur crosslinks rubber molecules mutually. The center 8 obtained by the sulfur crosslinking is soft. The center 8 accomplishes an outer-hard/inner-soft structure of the core 4. The core 4 suppresses the spin. The core 4 contributes also to feel at impact.

In light of the resilience performance of the golf ball 2, the amount of sulfur is preferably equal to or greater than 2.0 parts by weight, and particularly preferably equal to or greater than 3.0 parts by weight per 100 parts by weight of the base rubber. In light of the soft of the center 8, the amount of sulfur is preferably equal to or less than 10.0 parts by weight, and particularly preferably equal to or less than 6.5 parts by weight.

Preferably, the rubber composition of the center 8 contains a vulcanization accelerator. The vulcanization accelerator accomplishes the short crosslinking time of the center 8. A guanidine vulcanization accelerator, a thiazole vulcanization accelerator, a sulfenamide vulcanization accelerator, an aldehyde ammonia vulcanization accelerator, a thiourea vulcanization accelerator, a thiuram vulcanization accelerator, a dithiocarbamate vulcanization accelerator, a xanthate vulcanization accelerator and the like may be used. The guanidine vulcanization accelerator, the thiazole vulcanization accelerator and the sulfenamide vulcanization accelerator are preferred. Two or more kinds of vulcanization accelerators may be used in combination.

Illustrative examples of the guanidine vulcanization accelerator include 1,3-diphenylguanidine, 1,3-di-o-tolylguanidine, 1-o-tolylbiguanide and di-o-tolylguanidine salt of dicatechol borate. Specific examples of 1,3-diphenylguanidine include trade names "NOCCELER D" and "NOCCELER D-P", available from Ouchi Shinko Chemical Industrial Co., Ltd.; and trade names "SOXINOL D", "SOXINOL DG" and "SOXINOL DO", available from Sumitomo Chemical Co., Ltd. Specific examples of 1,3-di-o-tolylguanidine include trade name "NOCCELER DT", available from Ouchi Shinko Chemical Industrial Co., Ltd.; and trade names "SOXINOL DT" and "SOXINOL DT-O", available from Sumitomo Chemical Co., Ltd. Specific examples of 1-o-tolylbiguanide include trade name "NOCCELER BG", available from Ouchi Shinko Chemical Industrial Co., Ltd. Specific examples of di-o-tolylguanidine salt of dicatechol borate include trade name "NOCCELER PR", available from Ouchi Shinko Chemical Industrial Co., Ltd.

Illustrative examples of the thiazole vulcanization accelerator include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole and 2-(4'-morpholinodithio)benzothiazole. Specific examples of 2-mercaptobenzothiazole include trade names "NOCCELER M" and "NOCCELERM-P", available from Ouchi Shinko Chemical Industrial Co., Ltd. Specific examples of di-2-benzothiazolyl disulfide include trade names "NOCCELER DM" and "NOCCELER DM-P", available from Ouchi Shinko Chemical Industrial Co., Ltd. Specific examples of 2-mercaptobenzothiazole zinc salt include trade name "NOCCELER MZ", available from Ouchi Shinko Chemical Industrial Co., Ltd. Specific examples of 2-mercaptobenzothiazole cyclohexylamine salt include trade name "NOCCELER M-60-OT", available from Ouchi Shinko Chemical Industrial Co., Ltd. Specific examples of 2-(N,N-diethylthiocarbamoylthio)benzothiazole include trade name "NOCCELER 64", available from Ouchi Shinko Chemical Industrial Co., Ltd. Specific examples of 2-(4'-morpholinodithio)benzothiazole include trade names "NOCCELER MDB" and "NOCCELER MDB-P", available from Ouchi Shinko Chemical Industrial Co., Ltd.

Illustrative examples of the sulfenamide vulcanization accelerator include N-cyclohexyl-2-benzothiazolylsulfenamide, N-tert-butyl-2-benzothiazolylsulfenamide, N-oxydiethylene-2-benzothiazolylsulfenamide and N,N'-dicyclohexyl-2-benzothiazolylsulfenamide. Specific examples of N-cyclohexyl-2-benzothiazolylsulfenamide include trade names "NOCCELER CZ" and "NOCCELER CZ-G", available from Ouchi Shinko Chemical Industrial Co., Ltd. Specific examples of N-tert-butyl-2-benzothiazolylsulfenamide include trade names "NOCCELER NS" and "NOCCELER NS-P", available from Ouchi Shinko Chemical Industrial Co., Ltd. Specific examples of N-oxydiethylene-2-benzothiazolylsulfenamide include trade name "NOCCELER MSA-G", available from Ouchi Shinko Chemical Industrial Co., Ltd. Specific examples of N,N'-dicyclohexyl-2-benzothiazolylsulfenamide include trade names "NOCCELER DZ" and "NOCCELER DZ-G", available from Ouchi Shinko Chemical Industrial Co., Ltd.

The amount of the vulcanization accelerator per 100 parts by weight of the base rubber is preferably equal to or greater than 0.5 parts by weight, and particularly preferably equal to or greater than 2.0 parts by weight. The amount of the vulcanization accelerator is preferably equal to or less than 7.0 parts by weight, and particularly preferably equal to or less than 5.0 parts by weight.

Generally, a rubber composition of a center of a golf ball contains an organic peroxide. The organic peroxide contributes to the resilience performance of the golf ball. On the other hand, the organic peroxide increases the hardness of the center. The center 8 of the golf ball 2 according to the present invention does not contain the organic peroxide. The rubber composition provides the soft center 8.

Preferably, a reinforcing material is blended into the center 8. Preferable reinforcing material is silica (white carbon). Silica may accomplish the moderate rigidity of the center 8. Dried silica and wet silica may be used. In light of the rigidity of the center 8, the amount of silica per 100 parts by weight of the base rubber is preferably equal to or greater than 5 parts by weight, and particularly preferably equal to or greater than 10 parts by weight. In light of the soft of the center 8, the amount of silica is preferably equal to or less than 40 parts by weight, and particularly preferably equal to or less than 30 parts by weight. Together with silica, a silane coupling agent may be blended.

Into the center 8 may be blended a filler for the purpose of adjusting specific gravity and the like. Illustrative examples of suitable filler include zinc oxide, barium sulfate, calcium carbonate and magnesium carbonate. Powder of a highly dense metal may be also blended as the filler. Specific examples of the highly dense metal include tungsten and molybdenum. The amount of the filler is determined ad libitum so that the intended specific gravity of the center 8 can be accomplished. Particularly preferable filler is zinc oxide. Zinc oxide serves not only to adjust the specific gravity but also as a crosslinking activator.

Various kinds of additives such as an anti-aging agent, a coloring agent, a plasticizer, a dispersant, co-crosslinking agent, an organic sulfur compound and the like may be blended in an adequate amount to the center 8 as needed. Into the center 8 may be also blended crosslinked rubber powder or synthetic resin powder.

In light of the durability, the central hardness H1 of the center 8 is preferably equal to or greater than 20, more preferably equal to or greater than 25, and particularly preferably equal to or greater than 30. In light of the suppression of the spin, the central hardness H1 is preferably equal to or less than 50, more preferably equal to or less than 45, and particularly preferably equal to or less than 40. The central hardness H1 is measured by pressing a JIS-C type hardness scale on a central point of a cutting surface of a hemispherical body obtained by cutting the center 8. For the measurement, an automated rubber hardness tester (trade name "P1", available from KOBUNSH1 KEIKI CO., LTD.) which is equipped with this hardness scale is used.

The hardness of the center 8 increases gradually toward the surface from the central point. The surface hardness H2 of the center 8 is larger than the central hardness H1. The larger surface hardness H2 may accomplish the continuity of the hardness between the center 8 and the mid layer 10. In this respect, the surface hardness H2 of the center 8 is preferably equal to or greater than 25, more preferably equal to or greater than 30, and particularly preferably equal to or greater than 35. In light of the feel at impact, the surface hardness H2 is preferably equal to or less than 70, and more preferably equal to or less than 65. The surface hardness is measured by pressing a JIS-C type hardness scale on the surface of the center 8. For the measurement, an automated rubber hardness tester (trade name "P1", available from KOBUNSHI KEIKI CO., LTD.) which is equipped with this hardness scale is used.

In light of feel at impact, a difference (H2−H1) between the surface hardness H2 and the central hardness H1 is preferably equal to or greater than 1, more preferably equal to or greater than 3, and particularly preferably equal to or greater than 5. In light of resilience performance, the difference (H2−H1) is preferably equal to or less than 15, and more preferably equal to or less than 13.

Upon measurement of the amount of compressive deformation, the spherical body (center 8, core 4 or golf ball 2) is placed on a hard plate made of metal. A cylinder made of metal gradually descends toward the spherical body. The spherical body intervened between the bottom face of the cylinder and the hard plate is deformed. A migration distance of the cylinder, starting from the state in which initial load of 98N is applied to the spherical body up to the state in which final load of 1274N is applied thereto, is the amount of compressive deformation.

The diameter of the center 8 is smaller than the center of the general golf ball. The smaller center 8 may form the sufficiently thick mid layer 10. This mid layer 10 may accomplish an outer-hard/inner-soft structure having excellent continuity of hardness distribution. In light of the continuity of hardness distribution, the diameter of the center 8 is preferably equal to or less than 15 mm, more preferably equal to or less than 12 mm, still more preferably equal to or less than 10 mm, and particularly preferably equal to or less 9 mm. In light of the center 8 capable of contributing to the suppression of the spin, the diameter of the center 8 is preferably equal to or greater than 1 mm, more preferably equal to or greater than 2 mm, and particularly preferably equal to or greater than 3 mm.

The weight of the center 8 is preferably 0.05 g or greater and 3 g or less. The crosslinking temperature of the center 8 is usually 140° C. or greater and 180° C. or less. The crosslinking time of the center 8 is usually 5 minutes or longer and 60 minutes or less. The center 8 may have two or more layers. The center 8 may have a surface provided with a rib.

The mid layer 10 is formed by crosslinking a rubber composition. Illustrative examples of preferable base rubber include polybutadienes, polyisoprenes, styrene-butadiene copolymers, ethylene-propylene-diene copolymers and natural rubbers. In light of resilience performance, polybutadienes are preferred. When other rubber is used in combination with polybutadiene, it is preferred that polybutadiene is included as a principal component. Specifically, a proportion of polybutadiene in the entire base rubber is preferably equal to or greater than 50% by weight, and more preferably equal to or greater than 80% by weight. Preferably, polybutadiene has a proportion of cis-1,4 bonds of equal to or greater than 40%, and more preferably equal to or greater than 80%.

For crosslinking of the mid layer 10, a co-crosslinking agent is preferably used. Preferable examples of the co-crosslinking agent in light of the resilience performance include monovalent or bivalent metal salts of an α,β-unsaturated carboxylic acid having 2 to 8 carbon atoms. Specific examples of the preferable co-crosslinking agent include zinc acrylate, magnesium acrylate, zinc methacrylate and magnesium methacrylate. Zinc acrylate and zinc methacrylate are particularly preferred in light of the resilience performance.

As the co-crosslinking agent, an α,β-unsaturated carboxylic acid having 2 to 8 carbon atoms and a metal oxide may be also blended. Both components react in the rubber composition to give a salt. This salt contributes to the crosslinking reaction. Examples of preferable α,β-unsaturated carboxylic acid include acrylic acid and methacrylic acid. Examples of preferable metal oxide include zinc oxide and magnesium oxide.

In light of the resilience performance of the golf ball 2, the amount of the co-crosslinking agent is preferably equal to or greater than 10 parts by weight, and more preferably equal to or greater than 15 parts by weight per 100 parts by weight of the base rubber. In light of soft feel at impact, the amount of the co-crosslinking agent is preferably equal to or less than 50 parts by weight, and more preferably equal to or less than 45 parts by weight per 100 parts by weight of the base rubber.

Preferably, the rubber composition for use in the mid layer 10 includes the organic peroxide together with the co-crosslinking agent. The organic peroxide serves as a crosslinking initiator. The organic peroxide contributes to the resilience performance of the golf ball 2. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. In light of general versatility, dicumyl peroxide is preferred.

In light of the resilience performance of the golf ball 2, the amount of the organic peroxide is preferably equal to or greater than 0.1 parts by weight, more preferably equal to or greater than 0.3 parts by weight, and particularly preferably equal to or greater than 0.5 parts by weight per 100 parts by weight of the base rubber. In light of soft feel at impact, the amount of the blended organic peroxide is preferably equal to or less than 3.0 parts by weight, more preferably equal to or less than 2.8 parts by weight, and particularly preferably equal to or less than 2.5 parts by weight per 100 parts by weight of the base rubber.

Preferably, the rubber composition for use in the mid layer 10 includes an organic sulfur compound. Illustrative examples of preferable organic sulfur compound include mono-substituted forms such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; di-substituted forms such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide and bis(2-cyano-5-bromophenyl)disulfide; tri-substituted forms such as bis(2,4,6-trichlorophenyl)disulfide and bis(2-cyano-4-chloro-6-bromophenyl)disulfide; tetra-substituted forms such as bis(2,3,5,6-tetrachlorophenyl)disulfide; and penta-substituted forms such as bis(2,3,4,5,6-pentachlorophenyl)disulfide and bis(2,3,4,5,6-pentabromophenyl)disulfide. The organic sulfur compound contributes to the resilience performance. Particularly preferred organic sulfur compounds are diphenyl disulfide and bis(pentabromophenyl)disulfide.

In light of the resilience performance of the golf ball 2, the amount of the blended organic sulfur compound is preferably equal to or greater than 0.1 parts by weight, and more preferably equal to or greater than 0.2 parts by weight per 100 parts by weight of the base rubber. In light of soft feel at impact, the amount of the blended organic sulfur compound is preferably equal to or less than 1.5 parts by weight, more preferably equal to or less than 1.0 parts by weight, and particularly preferably equal to or less than 0.8 parts by weight per 100 parts by weight of the base rubber.

Into the mid layer 10 may be blended a filler for the purpose of adjusting specific gravity and the like. Illustrative examples of suitable filler include zinc oxide, barium sulfate, calcium carbonate and magnesium carbonate. Powder of a highly dense metal may be also blended as the filler. Specific examples of the highly dense metal include tungsten and molybdenum. The amount of the blended filler is determined ad libitum so that the intended specific gravity of the mid layer 10 can be accomplished. Particularly preferable filler is zinc oxide. Zinc oxide serves not only to adjust the specific gravity but also as a crosslinking activator. Various kinds of additives such as sulfur, an anti-aging agent, a coloring agent, a plasticizer, a dispersant and the like may be blended in an adequate amount to the mid layer 10 as needed. Into the mid layer 10 may be also blended crosslinked rubber powder or synthetic resin powder.

The mid layer 10 has a hardness gradually increasing to the surface (surface brought into contact with the cover 6) from the innermost part. The hardness H3 of the innermost part is small, and the hardness H4 of the surface is large. The small hardness H3 may accomplish the continuity of the hardness between the center 8 and the mid layer 10. The large hardness H4 accomplishes the outer-hard/inner-soft structure of the core 4. The mid layer 10 suppresses the spin sufficiently.

In light of the resilience performance, the hardness H3 of the innermost part is preferably equal to or greater than 45, and more preferably equal to or greater than 55. In light of the continuity of hardness distribution, the hardness H3 of the innermost part is preferably equal to or less than 75, more preferably equal to or less than 70, and particularly preferably equal to or less than 67. The hardness H3 is measured in a hemispherical body obtained by cutting the core 4. The hardness H3 is measured by pressing a JIS-C type hardness scale on the cutting surface of the hemispherical body. The hardness scale is pressed on an area surrounded by a first circle and a second circle. The first circle is a boundary between the center 8 and the mid layer 10. The second circle, which is concentric to the first circle, has a radius larger by 1 mm than that of the first circle. For the measurement, an automated rubber hardness tester (trade name "P1", available from KOBUNSH1 KEIKI CO., LTD.) which is equipped with this hardness scale is used.

In light of the outer-hard/inner-soft structure being accomplished, the surface hardness H4 is preferably equal to or greater than 65, more preferably equal to or greater than 75, and particularly preferably equal to or greater than 81. In light of feel at impact, the hardness H4 is preferably equal to or less than 90, and more preferably equal to or less than 85. The hardness H4 is measured by pressing the JIS-C type hardness scale on the surface of the mid layer 10. For the measurement, an automated rubber hardness tester (trade name "P1", available from KOBUNSH1 KEIKI CO., LTD.) which is equipped with this hardness scale is used.

In light of suppression of the spin, the difference (H4−H3) between the hardness H4 of the surface and the hardness H3 of the innermost part is preferably equal to or greater than 10, more preferably equal to or greater than 13, and particularly preferably equal to or greater than 14. In light of ease in manufacture, the difference (H4−H3) is preferably equal to or less than 25, and more preferably equal to or less than 20.

In light of the larger difference (H4−H3) capable of being accomplished, the thickness Tm of the mid layer 10 is preferably equal to or greater than 10 mm, more preferably equal to or greater than 11 mm, and particularly preferably equal to or greater than 12 mm. The thickness Tm is preferably equal to or less than 20 mm.

The weight of the mid layer 10 is preferably 30 g or greater and 44 g or less. The crosslinking temperature of the mid layer 10 is usually 140° C. or greater and 180° C. or less. The crosslinking time of the mid layer 10 is usually 10 minutes or longer and 60 minutes or less.

In light of continuity of hardness distribution, a difference (H3−H2) between the hardness H3 of the innermost part of the mid layer 10 and the surface hardness H2 of the center 8 is preferably equal to or less than 35, more preferably equal to or less than 33, and particularly preferably equal to or less than 30. The difference (H3−H2) is preferably equal to or greater than 1, more preferably equal to or greater than 3, and particularly preferably equal to or greater than 5.

In light of the suppression of the spin, a difference (H4−H1) between the hardness H4 of the surface of the mid layer 10 and the central hardness H1 of the center 8 is preferably equal to or greater than 30, more preferably equal to or greater than 36, and particularly preferably equal to or greater than 40. In light of ease in manufacture, the difference (H4−H1) is preferably equal to or less than 65, and more preferably equal to or less than 60.

In light of feel at impact, the amount D2 of compressive deformation of the core 4 is preferably equal to or greater than 2.3 mm, more preferably equal to or greater than 2.4 mm, and particularly preferably equal to or greater than 2.5 mm. In light of resilience performance, the amount D2 of compressive deformation is preferably equal to or less than 4.0 mm, more preferably equal to or less than 3.9 mm, and particularly preferably equal to or less than 3.8 mm.

A resin composition is suitably used for the cover 6. Illustrative examples of the base polymer of the resin composition include an ionomer resin, polyester, polyamide, polyolefin and polystyrene. The ionomer resin is particularly preferred. The ionomer resin is highly elastic. The golf ball 2 having the ionomer resin used for the cover 6 is excellent in resilience performance.

The ionomer resin and other resin may be used in combination. When they are used in combination, the ionomer resin is included as a principal component of the base polymer, in light of resilience performance. A proportion of the ionomer resin in the entire base polymer is preferably equal to or greater than 50% by weight, more preferably equal to or greater than 70% by weight, and particularly preferably equal to or greater than 85%.

Examples of preferred ionomer resin include binary copolymers formed with α-olefin and an α,β-unsaturated carboxylic acid having 3 to 8 carbon atoms. Preferable binary copolymer includes 80% by weight or greater and 90% by weight or less of α-olefine and 10% by weight or greater and 20% by weight or less of α,β-unsaturated carboxylic acid. This binary copolymer provides excellent resilience performance. Examples of preferable other ionomer resins include ternary copolymers formed with α-olefine, an α,β-unsaturated carboxylic acid having 3 to 8 carbon atoms, and an α,β-unsaturated carboxylate ester having 2 to 22 carbon atoms. Preferable ternary copolymer comprises 70% by weight or greater and 85% by weight or less of α-olefin, 5% by weight or greater 30% by weight or less of α,β-unsaturated carboxylic acid, and 1% by weight or greater and 25% by weight or less of α,β-unsaturated carboxylate ester. This ternary copolymer has excellent resilience performance. In the binary and ternary copolymers, preferable α-olefin is ethylene and propylene, and preferable α,β-unsaturated carboxylic acid is acrylic acid and methacrylic acid. Particularly preferred ionomer resin is a copolymer formed with ethylene, and acrylic acid or methacrylic acid.

In the binary and ternary copolymers, apart of the carboxyl groups is neutralized with a metal ion. Illustrative examples of the metal ion for use in neutralization include sodium ion, potassium ion, lithium ion, zinc ion, calcium ion, magnesium ion, aluminum ion and neodymium ion. The neutralization may be carried out with two or more kinds of metal ions. Particularly suitable metal ion in light of the resilience performance and durability of the golf ball 2 is sodium ion, zinc ion, lithium ion and magnesium ion.

Specific examples of the ionomer resin include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan MK7320" and "Himilan MK7329", available from Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF 1000" and "HPF 2000", available from Du Font Kabushiki Kaisha; and trade names "IOTEK 7010", "IOTEK 7030", "IOTEK 7510", "IOTEK 7520", "IOTEK 8000" and "IOTEK 8030", available from EXXON Mobil Chemical Corporation.

Two or more kinds of the ionomer resins may be used in combination into the cover 6. An ionomer resin neutralized with a monovalent metal ion, and an ionomer resin neutralized with a bivalent metal ion may be used in combination.

The preferable resin which may be used in combination with the ionomer resin is the styrene block-containing thermoplastic elastomer. The styrene block-containing thermoplastic elastomer includes a polystyrene block as a hard segment, and a soft segment. Typical soft segment is a diene block. Illustrative examples of a diene block compounds include butadiene, isoprene, 1,3-pentadiene and 2,3-dimethyl-1,3-butadiene. Butadiene and isoprene are preferred. Two or more compounds may be used in combination.

The styrene block-containing thermoplastic elastomer may include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS or a hydrogenated product of SIBS. Example of hydrogenated product of SBS is a styrene-ethylene-butylene-styrene block copolymer (SEBS). Exemplary hydrogenated product of SIS is a styrene-ethylene-propylene-styrene block copolymer (SEPS). Exemplary hydrogenated product of SIBS is a styrene-ethylene-ethylene-propylene-styrene block copolymer (SEEPS).

In light of the resilience performance of the golf ball 2, the content percentage of styrene component in the thermoplastic elastomer is preferably equal to or greater than 10% by weight, more preferably equal to or greater than 12% by weight, and particularly preferably equal to or greater than 15% by weight. In light of the feel at impact of the golf ball 2, the content percentage is preferably equal to or less than 50% by weight, more preferably equal to or less than 47% by weight, and particularly preferably equal to or less than 45% by weight.

In the present invention, the styrene block-containing thermoplastic elastomer includes an alloy of olefin with one or more selected from the group consisting of SBS, SIS, SIBS, SEBS, SEPS and SEEPS, and hydrogenated products thereof. The olefin component in this alloy is speculated to contribute to improvement of the compatibility with the ionomer resin. When this alloy is used, the resilience performance of the golf ball 2 is improved. Preferably, olefin having 2 to 10 carbon atoms is used. Illustrative examples of suitable olefin include ethylene, propylene, butene and pentene. Ethylene and propylene are particularly preferred.

Specific examples of the polymer alloy include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N" and "Rabalon SR04", available from Mitsubishi Chemical Corporation. Other specific examples of the styrene block-containing thermoplastic elastomer include a trade name "Epofriend A1010", available from DAICEL CHEMICAL INDUSTRIES, LTD.; and a trade name "Septon HG-252", available from KURARAY CO., LTD.

Into the cover 6 may be blended a coloring agent such as titanium dioxide, a filler such as barium sulfate, a dispersant, an antioxidant, an ultraviolet absorbent, a light stabilizer, a fluorescent agent, a fluorescent brightening agent and the like in an appropriate amount as needed.

In light of the resilience performance, the hardness Hc of the cover 6 is preferably equal to or greater than 50, more preferably equal to or greater than 55, and particularly preferably equal to or greater than 60. In light of the feel at impact, the hardness Hc is preferably equal to or less than 75, and more preferably equal to or less than 70. The hardness Hc may be measured in accordance with a standard of "ASTM-D 2240-68" by using a D type shore spring hardness scale attached to an automated rubber hardness tester (trade name "PI", available from KOBUNSHI KEIKI CO., LTD.). For the measurement, a slab formed by hot pressing to have a thickness of about 2 mm is used. Prior to the measurement, the slab is stored at a temperature of 23° C. for two weeks. When the measurement is carried out, three pieces of the slab are overlaid. In the measurement, a slab constituted with the same resin composition as that of the cover 6 is used.

In light of durability, the thickness Tc of the cover 6 is preferably equal to or greater than 0.5 mm, more preferably equal to or greater than 1.0 mm, and particularly preferably equal to or greater than 1.5 mm. In light of feel at impact, the thickness Tc is preferably equal to or less than 3.0 mm, and more preferably equal to or less than 2.3 mm.

Known techniques such as injection molding and compression molding may be adopted for the formation of the cover 6. In molding the cover 6, dimples 12 is formed by multiple pimples formed in a cavity surface of a mold.

In light of feel at impact, the amount D3 of compressive deformation of the golf ball 2 is preferably equal to or greater than 2.0 mm, more preferably equal to or greater than 2.1 mm, and particularly preferably equal to or greater than 2.2 mm. In light of resilience performance, the amount D3 of compressive deformation is preferably equal to or less than 3.7 mm, more preferably equal to or less than 3.6 mm, and particularly preferably equal to or less than 3.5 mm.

EXAMPLES

Example 1

A rubber composition (a) was obtained by kneading 100 parts by weight of high-cis polybutadiene (trade name "BR-730", available from JSR Corporation), 5 parts by weight of zinc oxide, an adequate amount of barium sulfate, 10 parts by weight of silica (tradename "Nipsil AQ", available from TOSHO SILICA CORPORATION), 3.4 parts by weight of sulfur, 2.20 parts by weight of a vulcanization accelerator (aforementioned "NOCCELER CZ"), and 2.26 parts by weight of the other vulcanization accelerator (the aforementioned "SOXINOL DG"). This rubber composition (a) was placed into a mold having upper and lower mold halves, each of the halves having a hemispherical cavity, and heated at 150° C. for 5 minutes to obtain a center having a diameter of 5.0 mm.

A rubber composition (e) was obtained by kneading 100 parts by weight of high-cis polybutadiene (aforementioned "BR-730"), 37 parts by weight of zinc diacrylate, 5 parts by weight of zinc oxide, an adequate amount of barium sulfate, 0.5 parts by weight of diphenyl disulfide and 0.7 parts by weight of dicumyl peroxide. A half shell was formed from this rubber composition (e). The center was covered with two half shells. The center and the half shells were placed into a mold having upper and lower mold halves, each of the halves having a hemispherical cavity, and heated at 170° C. for 20 minutes to obtain a core having a diameter of 39.5 mm. The amount of barium sulfate was adjusted so that the specific gravity of the mid layer corresponded to that of the center and the weight of the ball was made to be 45.6 g.

52 parts by weight of an ionomer resin (aforementioned "Surlyn 8945"), 40 parts by weight of other ionomer resin (aforementioned "Himilan 7329"), 8 parts by weight of a styrene block-containing thermoplastic elastomer (aforementioned "Rabalon T3221C") and 3 parts by weight of titanium dioxide were kneaded in a twin screw kneading extruder to obtain a resin composition. The core was placed into a final mold having upper and lower mold halves, each of the halves having a hemispherical cavity. The aforementioned resin composition was injected around the core by injection molding to form a cover. The cover had a thickness of 1.6 mm. Numerous dimples having a shape inverted from the shape of the pimple were formed on the cover. A clear paint including a two-part liquid curable polyurethane as a base was applied around this cover to give a golf ball of Example 1 having a diameter of 42.7 mm and a weight of about 45.6 g.

Examples 2 to 4 and Comparative Examples 1 to 4

Golf balls of Examples 2 to 4 and Comparative Examples 1 to 4 were obtained in a similar manner to Example 1 except that specifications of the center and the mid layer were as listed in Tables 2 and 3 below. Details of the rubber composition of the center are presented in Table 1 below. The golf ball according to Comparative Example 1 does not have the mid layer.

[Shot with Driver (W#1)]

A driver with a titanium head (trade name "XXIO", available from SRI Sports Limited, shaft hardness: R, loft angle: 11.0°) was attached to a swing machine available from Golf Laboratory Co. The golf balls were hit under a condition to give the head speed of 40 m/sec, and distance from the launching point to the point where the ball stopped was measured. A ball speed and backspin rate immediately after the impact were also measured. Mean values of data obtained by the measurement of 12 times are shown in Tables 2 and 3 below.

[Shot with Iron Club (I#5)]

An iron club (#5) (trade name "XXIO", available from SRI Sports Limited, shaft hardness: R) was attached to the swing machine described above. The golf balls were hit under a condition to give the head speed of 34 m/sec, and distance from the launching point to the point where the ball stopped was measured. A ball speed and back spin rate immediately after the impact were also measured. Mean values of data obtained by the measurement of 12 times are shown in Tables 2 and 3 below.

TABLE 1

Compositions of center and mid layer (parts by weight)

| | (a) | (b) | (c) | (d) | (e) |
|---|---|---|---|---|---|
| Polybutadiene | 100 | 100 | 100 | 100 | 100 |
| Zinc diacrylate | — | — | — | 15 | 37 |
| Zinc oxide | 5 | 5 | 5 | 5 | 5 |
| Barium sulfate | Adequate amount | Adequate amount | Adequate amount | Adequate amount | Adequate amount |
| Silica | 10 | 20 | 30 | — | — |
| Diphenyl disulfide | — | — | — | 0.5 | 0.5 |

TABLE 1-continued

Compositions of center and mid layer (parts by weight)

|  | (a) | (b) | (c) | (d) | (e) |
|---|---|---|---|---|---|
| Dicumyl peroxide | — | — | — | 0.7 | 0.7 |
| Slfur | 3.4 | 3.4 | 3.4 | — | — |
| Vulcanization accelerator CZ | 2.20 | 2.20 | 2.20 | — | — |
| Vulcanization accelerator DG | 2.26 | 2.26 | 2.26 | — | — |

TABLE 2

Results of evaluation

|  |  | Example 1 | Example 2 | Example 3 | Example 4 |
|---|---|---|---|---|---|
| Center | Composition | (a) | (b) | (c) | (c) |
|  | Diameter (mm) | 5.0 | 7.0 | 10.0 | 9.0 |
|  | Central hardness H1 (JIS-C) | 30 | 35 | 40 | 40 |
|  | Surface hardness H2 (JIS-C) | 35 | 41 | 47 | 47 |
|  | Crosslinking temperature (° C.) | 150 | 150 | 150 | 150 |
|  | Crosslinking time (min) | 5 | 5 | 5 | 5 |
| Mid layer | Thickness Tm (mm) | 17.25 | 16.25 | 14.75 | 15.25 |
|  | Innermost part hardness H3 (JIS-C) | 63 | 65 | 67 | 66 |
|  | Surface hardness H4 (JIS-C) | 81 | 81 | 81 | 81 |
|  | Difference (H4-H3) | 18 | 16 | 14 | 15 |
|  | Crosslinking temperature (° C.) | 170 | 170 | 170 | 170 |
|  | Crosslinking time (min) | 20 | 20 | 20 | 20 |
| Core | Difference (H3-H2) | 28 | 24 | 20 | 19 |
|  | Difference (H4-H1) | 51 | 46 | 41 | 41 |
|  | Compressive deformation D2 (mm) | 3.00 | 3.00 | 3.00 | 3.00 |
| Cover | Thickness Tc (mm) | 1.6 | 1.6 | 1.6 | 1.6 |
|  | Hardness Hc (Shore D) | 60 | 60 | 60 | 60 |
| Ball | Compressive deformation D3 (mm) | 2.60 | 2.60 | 2.60 | 2.60 |
| W#1 | Initial velocity (m/s) | 59.1 | 59.1 | 59.1 | 59.1 |
|  | Spin (rpm) | 2450 | 2450 | 2450 | 2450 |
|  | Flight distance (m) | 213.5 | 213.5 | 213.5 | 213.5 |
| I#5 | Initial velocity (m/s) | 49.4 | 49.4 | 49.4 | 49.4 |
|  | Spin (rpm) | 3800 | 3750 | 3700 | 3750 |
|  | Flight distance (m) | 158.6 | 158.6 | 159.1 | 158.6 |

TABLE 3

Results of evaluation

|  |  | Compara. Example 1 | Compara. Example 2 | Compara. Example 3 | Compara. Example 4 |
|---|---|---|---|---|---|
| center | Composition | (e) | (d) | (c) | (a) |
|  | Diameter (mm) | 39.5 | 7.0 | 20.0 | 5.0 |
|  | Central hardness H1 (JIS-C) | 62 | 55 | 40 | 30 |
|  | Surface hardness H2 (JIS-C) | 81 | 61 | 51 | 35 |
|  | Crosslinking temperature (° C.) | 170 | 150 | 150 | 150 |
|  | Crosslinking time (min) | 20 | 5 | 5 | 5 |
| Mid layer | Thickness Tm (mm) | — | 16.25 | 9.75 | 17.25 |
|  | Innermost part hardness H3 (JIS-C) | — | 65 | 72 | 72 |
|  | Surface hardness H4 (JIS-C) | — | 81 | 81 | 81 |
|  | Difference (H4-H3) | — | 16 | 9 | 9 |
|  | Crosslinking temperature (° C.) | — | 170 | 170 | 150 |
|  | Crosslinking time (min) | — | 20 | 20 | 30 |
| Core | Difference (H3-H2) | — | 4 | 21 | 37 |
|  | Difference (H4-H1) | 19 | 26 | 41 | 48 |
|  | Compressive deformation D2 (mm) | 2.90 | 2.95 | 2.95 | 2.95 |
| Cover | Thickness Tc (mm) | 1.6 | 1.6 | 1.6 | 1.6 |
|  | Hardness Hc (Shore D) | 60 | 60 | 60 | 60 |

TABLE 3-continued

Results of evaluation

|  |  | Compara. Example 1 | Compara. Example 2 | Compara. Example 3 | Compara. Example 4 |
|---|---|---|---|---|---|
| Ball | Compressive deformation D3 (mm) | 2.50 | 2.55 | 2.55 | 2.55 |
| W#1 | Initial velocity (m/s) | 59.2 | 59.1 | 58.9 | 59.1 |
|  | Spin (rpm) | 2600 | 2550 | 2550 | 2550 |
|  | Flight distance (m) | 212.1 | 211.7 | 210.3 | 211.7 |
| I#5 | Initial velocity (m/s) | 49.5 | 49.4 | 49.2 | 49.4 |
|  | Spin (rpm) | 4000 | 3950 | 3900 | 3900 |
|  | Flight distance (m) | 157.3 | 156.8 | 155.9 | 157.3 |

As shown in Tables 2 and 3, the golf ball of each Example is excellent in the flight performance. Therefore, advantages of the present invention are clearly suggested by these results of evaluation.

The golf ball according to the present invention may be used in playing on a golf course and in practicing on a driving range. The description hereinabove is merely for illustrative examples, and various modifications can be made without departing from the principles of the present invention.

What is claimed is:

1. A golf ball comprising:
   a core comprising a center and a mid layer positioned outside the center; and
   a cover positioned outside the mid layer, wherein:
   the center has a diameter of 1 mm or greater and 15 mm or less;
   the golf ball has a diameter of 42.67 mm or greater and 42.80 mm or less;
   a thickness Tm of the mid layer is equal to or greater than 11 mm and equal to or less than 20 mm;
   the center has a central point having a JIS-C hardness H1 of 20 or greater and 50 or less;
   a difference (H4−H3) between a JIS-C hardness H4 of a surface of the mid layer and a JIS-C hardness H3 of an innermost part thereof is equal to or greater than 14;
   a JIS-C hardness H2 of a surface of the center is larger than the hardness H1 of the central point of the center;
   a difference (H3−H2) between the hardness H3 and the hardness H2 of the surface of the center is equal to or less than 35;
   a difference (H2−H1) between the surface hardness H2 and the central hardness H1 is equal to or more than 1 and equal to or less than 7;
   a hardness of the center increases gradually toward the surface of the center from the central point of the center;
   a hardness of the mid layer increases gradually toward the surface of the mid layer from the innermost part of the mid layer;
   an amount D2 of compressive deformation of the core is equal to or greater than 2.3 mm but equal to or less than 4.0 mm; and
   an amount D3 of compressive deformation of the golf ball is equal to or greater than 2.0 mm but equal to or less than 3.7 mm.

2. The golf ball according to claim 1, wherein a difference (H4−H1) between the hardness H4 and the hardness H1 is equal to or greater than 40.

3. The golf ball according to claim 1, wherein:
   the center is formed by crosslinking a rubber composition;
   a base rubber of the rubber composition contains polybutadiene as a principal component; and
   the rubber composition contains sulfur as a crosslinking agent.

4. The golf ball according to claim 1, wherein:
   the mid layer is formed by crosslinking a rubber composition; and
   a base rubber of the rubber composition contains polybutadiene as a principal component.

* * * * *